US009591379B2

(12) United States Patent
Shanson et al.

(10) Patent No.: US 9,591,379 B2
(45) Date of Patent: Mar. 7, 2017

(54) SYSTEMS AND METHODS FOR PROVIDING AN ADVERTISEMENT CALLING PROXY SERVER

(71) Applicant: Net2.TV, LTD, San Mateo, CA (US)

(72) Inventors: Spencer Shanson, Menlo Park, CA (US); Tom Buchok, New York, NY (US)

(73) Assignee: NET2.TV, LTD., San Mateo, CA (US)

( * ) Notice: Subject to any disclaimer, the term of this patent is extended or adjusted under 35 U.S.C. 154(b) by 0 days.

(21) Appl. No.: 14/924,402

(22) Filed: Oct. 27, 2015

(65) Prior Publication Data

US 2016/0127803 A1 May 5, 2016

Related U.S. Application Data

(60) Provisional application No. 62/072,870, filed on Oct. 30, 2014.

(51) Int. Cl.

| | |
|---|---|
| ***H04N 7/10*** | (2006.01) |
| ***H04N 7/025*** | (2006.01) |
| ***H04N 21/81*** | (2011.01) |
| ***H04L 29/08*** | (2006.01) |
| ***H04L 29/06*** | (2006.01) |
| ***H04N 21/222*** | (2011.01) |

(Continued)

(52) U.S. Cl.
CPC ........... *H04N 21/812* (2013.01); *G11B 27/10* (2013.01); *H04L 67/28* (2013.01); *H04L 67/42* (2013.01); *H04N 21/222* (2013.01); *H04N 21/2393* (2013.01); *H04N 21/23113* (2013.01); *H04N 21/25891* (2013.01); *H04N 21/2668* (2013.01); *H04N 21/64322* (2013.01); *H04N 21/8456* (2013.01); *H04N 21/858* (2013.01)

(58) Field of Classification Search
CPC .............. H04N 21/812; H04N 21/222; H04N 21/23113; H04N 21/2393; H04N 21/25891; H04N 21/2668; H04N 21/64322; H04N 21/8456; H04N 21/858; G11B 27/10; H04L 67/42; H04L 67/28
USPC ................................................ 725/32, 34–36
See application file for complete search history.

(56) References Cited

U.S. PATENT DOCUMENTS 6,314,451 B1 * 11/2001 Landsman ............. G06Q 30/02 709/202
2012/0023570 A1 * 1/2012 Gorodyansky ..... H04L 63/0407 726/12

(Continued)

*Primary Examiner* — Oleg Asanbayev
(74) *Attorney, Agent, or Firm* — Wilmer Cutler Pickering Hale and Dorr LLP

(57) ABSTRACT

Described herein are techniques for requesting advertisement content on behalf a client device from a first server. The first server receives a request from the client device to receive advertisement content, wherein the request includes client information. The first server retrieves break data based on the request, wherein the break data includes one or more links to a second server. The first server replaces any dynamic parameters contained in the one or more links with at least one value based on the client information. The first server requests, from the second server, at least one advertisement segment based on the one or more links. The first server receives, from the second server, a first response to the request. The first server then provides a second response to the client device, wherein the second response is based on the first response.

18 Claims, 6 Drawing Sheets

(51) Int. Cl.

| | |
|---|---|
| *G11B 27/10* | (2006.01) |
| *H04N 21/845* | (2011.01) |
| *H04N 21/858* | (2011.01) |
| *H04N 21/231* | (2011.01) |
| *H04N 21/643* | (2011.01) |
| *H04N 21/239* | (2011.01) |
| *H04N 21/258* | (2011.01) |
| *H04N 21/2668* | (2011.01) |

(56) References Cited

U.S. PATENT DOCUMENTS

| | | | | |
|---|---|---|---|---|
| 2012/0226561 | A1* | 9/2012 | Sinn | G06Q 30/0251<br>705/14.66 |
| 2013/0268963 | A1* | 10/2013 | Nugent | H04N 21/435<br>725/32 |
| 2015/0023160 | A1* | 1/2015 | Alisawi | H04L 47/32<br>370/230 |

* cited by examiner

SYSTEMS AND METHODS FOR PROVIDING AN ADVERTISEMENT CALLING PROXY SERVER

RELATED APPLICATIONS

This application relates to and claims priority under 35 U.S.C. §119(e) to U.S. Provisional Patent Application No. 62/072,870, filed on Oct. 30, 2014, which is hereby incorporated herein by reference in its entirety.

FIELD

The subject matter disclosed in this application generally relates to the field of digital content distribution and, more specifically, to an advertisement-calling proxy server.

BACKGROUND

Today, with the ubiquity of multimedia digital content such as video streams that are available from the Internet, consumers spend some time watching video streams on client devices, such as media players, as well as watching traditional television. The content played by the media players generally includes both primary content, such as video streams, and secondary content, such as advertisements (including, for example, both commercial advertisements and public announcements). Traditionally, the media players directly request advertisements from different advertisement services; however, there are several issues associated with this approach. First, different advertisement services may use different ad-server protocols. Some advertisement services use protocols that conform to the Video Ad Serving Template (VAST) protocol, which is defined by the Interactive Advertising Bureau and incorporated herein by reference in its entirety (Specifications for VAST 3.0 can be found, for example, at http://www.iab.net/vast), and some advertisement services may use protocols that do not conform to the VAST protocol. Second, even for advertisement services that use the VAST protocol, different companies may have variations in how they interpret the VAST specification. Third, protocols such as the VAST protocol use extensible markup language (XML), which may not be friendly to media players or platforms that run on browsers with limited memory footprints (such as embedded TV browsers) and/or are non-HTML platforms. As a result, it is difficult to create a single lightweight media player application that can run on all media players/platforms and incorporate all the logic required to make advertisement requests from different advertisement services.

Therefore, there is a need in the art to provide systems and methods for addressing the issues faced by the lightwieght meida player applications. Accordingly, it is desirable to provide methods and systems that overcome these and other deficiencies of the related art.

SUMMARY

In accordance with the disclosed subject matter, systems, methods, and computer readable media are provided for an advertisement-calling proxy server, which can, among others, request advertisement content on behalf of a client device and return a response to the client device.

Disclosed subject matter includes, in one aspect, a computerized method. The method includes receiving, by a first server, a request from a client device to receive advertisement content, wherein the request includes client information. The method includes retrieving, by the first server, break data based on the request, wherein the break data includes one or more links to a second server. The method includes replacing, by the first server, any dynamic parameters contained in the one or more links with at least one value based on the client information. The method includes requesting, by the first server from the second server, at least one advertisement segment based on the one or more links. The method includes receiving, by the first server from the second server, a first response to the request. The methode includes providing, by the first server, a second response to the client device, wherein the second response is based on the first response.

Disclosed subject matter includes, in another aspect, an apparatus. The apparatus includes one or more processors. The apparatus includes a memory storing a program that, when executed, causes the one or more processors to: receive a request from a client device to receive advertisement content, wherein the request includes client information; retrieve break data based on the request, wherein the break data includes one or more links to a first server; replace any dynamic parameters contained in the one or more links with at least one value based on the client information; request, from the first server, at least one advertisement segment based on the one or more links; receive, from the first server, a first response to the request; and provide a second response to the client device, wherein the second response is based on the first response.

Disclosed subject matter includes, in yet another aspect, a non-transitory computer readable medium comprising executable instructions. The instructions are operable to cause an apparatus to receive a request from a client device to receive advertisement content, wherein the request includes client information. The instructions are operable to cause the apparatus to retrieve break data based on the request, wherein the break data includes one or more links to a first server. The instructions are operable to cause the apparatus to replace any dynamic parameters contained in the one or more links with at least one value based on the client information. The instructions are operable to cause the apparatus to request, from the first server, at least one advertisement segment based on the one or more links. The instructions are operable to cause the apparatus to receive, from the first server, a first response to the request. The instructions are operable to cause the apparatus to provide a second response to the client device, wherein the second response is based on the first response.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

These and other capabilities of embodiments of the disclosed subject matter will be more fully understood after a review of the following figures, detailed description, and claims.

It is to be understood that both the foregoing general description and the following detailed description are explanatory only and are not restrictive of the claimed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings.

DESCRIPTION

Figure 1:
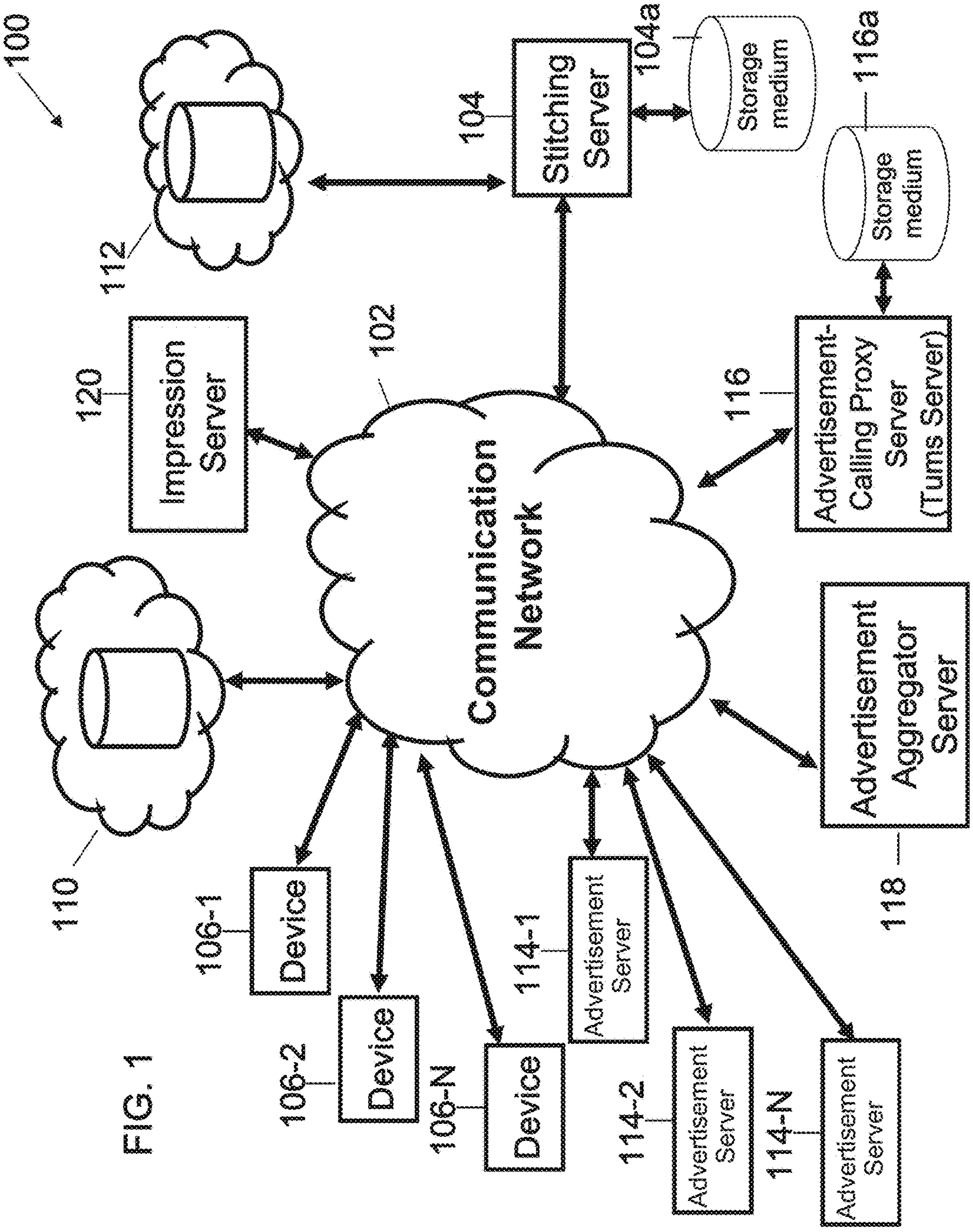
FIG. 1 illustrates a block diagram of a networked computing environment for providing an advertisement-calling proxy server, according to some embodiments of the disclosed subject matter.

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

The application relates to requesting and providing advertisement content for a client device, which can, among other things, play streamed video. In a preferred embodiment, the streamed video is composed of multiple shorter video streams (segments) and advertisement break segments. The segments can be assembled together into a linear playlist. In some embodiments, other suitable types of playlist can also be created. One or more advertisements (including, for example, commercial advertisements, public announcements, or any other suitable content) are dynamically inserted into the playlist at one or more break locations. In some embodiments, the advertisement can be selected by an ad-decision engine. There are many third-party ad-decision engines from companies such as YuMe, Tremor, Doubleclick, etc. Each individual segment represents a piece of content hosted on a server (as a non-limiting example, the server can be a content delivery network ("CDN")). In some embodiments, the streamed video can be a full-length television episode, multiple television episodes, or a subset of a television episode. In some embodiments, the streamed video can be any other suitable content. In a preferred embodiment, the break segment can be an advertisement segment, which can include commercial advertisements, public announcements, or any other suitable content.

In some embodiments, the streamed video is compatible with Apple's Hypertext Transfer Protocol (HTTP) Live Streaming (HLS) adaptive streaming protocol (incorporated fully herein by reference and which may be found, for example at https://tools.ietf.org/html/draft-pantos-http-live-streaming-13?), and any associated HLS .m3u8 manifest files and .ts chunks can be generated by transcoding service and delivered by a server such as a CDN. In some embodiments, the streamed video can be compatible with a non-standard version of the HLS protocol or any other suitable streaming protocols.

As described above, when a client device directly requests advertisements from different advertisement services, several issues can arise. This application relates to a solution for these issues by extracting the logic for making advertisement calls from the client device application and placing it in a server (called a Tums server). The Tums server makes advertisement calls on behalf of the client device, and package the results in a response that is delivered to the calling device.

The disclosed embodiments can be implemented in a networked computing environment. FIG. 1 illustrates an exemplary networked computing environment 100 in accordance with some embodiments. The networked computing environment 100 can include a stitching server 104 coupled to a physical storage medium 104*a*, at least one client device 106 (e.g., client device 106-1, 106-2, 106-N), at least one advertisement server 114 (e.g., advertisement server 114-*a*, 114-2, 114-N), an advertisement-calling proxy server 116 (the advertisement-calling proxy server 116 is also referred to as a Tums server 116 throughout the application) coupled to physical storage medium 116-A, an advertisement aggregator server 118, an impression server 120, and cloud storage 110 and 112. Some or all components of the networked computing environment 100 can be coupled directly or indirectly to a communication network 102. The components included in the networked computing environment 100 can be further broken down into more than one component and/or combined together in any suitable arrangement. Further, one or more components can be rearranged, changed, added, and/or removed. For example, in some embodiments, the stitching server 104, the Tums server 116, and/or the impression server 120 can be combined into one or more servers.

Each client device 106 can communicate with the stitching server 104 and/or the Tums server 116 to send data to, and receive data from, the stitching server 104 and/or the Tums server 116 across the communication network 102. Each client device 106 can be directly coupled to the stitching server 104 and/or the Tums server 116. Additionally, each client device 106 can be connected to the stitching server 104 and/or the Tums server 116 via any other suitable devices, communication networks, or combination thereof. For example, each client device 106 can be coupled to the stitching server 104 and/or the Tums server 116 via one or more routers, switches, access points, and/or communication network (as described below in connection with communication network 102). A client device 106 can include, for example, a desktop computer, a mobile computer, a tablet computer, a cellular device, a smartphone, television, or any computing systems that are capable of performing computation. The client device 106 can include a module that is configured to enable a user to request a particular episode of a media item. In some embodiments, the client device 106 can also be referred to as a media playing device. In some embodiments, the client device 106 can be an HLS complaint HLS player. In some embodiments, the client device 106 can be a Portico media player provided by Net2TV.

The stitching server 104 stitches primary video content, such as streamed video segments, and secondary video content, such as advertisement segments, into a playlist and provides the playlist to a client. Some embodiments of the stitching server 104 are disclosed in U.S. patent application Ser. No. 14/852,061, filed on Sep. 11, 2015, and titled "Server-side Playlist Stitching," which is hereby incorporated herein by reference in its entirety. In some embodiments, the stitching server 104 can also be referred to as a stitcher, a playlist stitcher, and/or a playlist stitching server. The stitching server 104 can be coupled to one or more physical storage media and/or one or more cloud storage media, which can be configured to store data for the stitching server 104. FIG. 1 shows the stitching server 104 and the physical storage medium 104*a* as separate components; however, the stitching server 104 and physical storage medium 104*a* can be combined together. FIG. 1 also shows the stitching server 104 as a single server; however, the stitching server 104 can include more than one server. FIG. 1 shows the physical storage medium 104*a* as a single physical storage medium; however, physical storage medium 104*a* can include more than one physical storage medium. The physical storage medium 104*a* can be located in the same physical location as the stitching server 104, at a remote location, or any other suitable location or combination of locations.

The Tums server 116 can receive a request from a client device 106 to receive advertisement content, and the request can include client information. The Tums server 116 can retrieve break data based on the request, and the break data can include one or more links to one or more advertisement servers 114 and/or the advertisement aggregator server 118. The Tums server 116 can replace any dynamic parameters contained in the one or more links with at least one value based on the client information. The Tums server 116 can request from the one or more advertisement servers 114 and/or the advertisement aggregator server 118 at least one advertisement segment based on the one or more links. The Tums server 116 can receive from the one or more advertisement servers 114 and/or the advertisement aggregator server 118 a first response to the request. The Tums server 116 can provide a second response to the client device, and the second response is based on the first response. The Tums server 116 can be coupled to one or more physical storage media and/or one or more cloud storage media, which can be configured to store data for the Tums server 116. FIG. 1 shows the Tums server 116 and the physical storage medium 116*a* as separate components; however, the Tums server 116 and physical storage medium 116*a* can be combined together. FIG. 1 shows the Tums server 116 as a single server; however, the Tums server 116 can include more than one server. As described above, Tums server 116 is also referred to as the advertisement-calling proxy server 116, and these two terms are used interchangeably throughout this application. In some embodiment, the Tums server 116 requests advertisement segments from an advertisement server 114 or an advertisement aggregator server 118 using protocols that conform to the VAST protocol, and the Tums server 116 can also be referred to as a VAST-calling server, a VAST proxy server, or a VAST-calling proxy server.

The networked computing environment 100 can also include one or more advertisement servers 114-1, 114-2, . . . , 114-N. The advertisement server 114 can provide data for advertisement segments requested by the Tums server 116. In some embodiments, the data are one or more links to the underlying advertisement segments. One or more advertisement servers 114 can be requested by the Tums server 116 for advertisement segments. In some embodiments, the advertisement aggregator server 118 is configured to act as a front end to one or more advertisement servers 114, and the Tums server 116 requests advertisement content from the advertisement aggregator server 118. The advertisement aggregator server 118 then requests and retrieves advertisement content from one or more advertisement servers 114. In some embodiments, the advertisement aggregator server 118 has its own CDN and directly retrieves and provides advertisement content. The advertisement content provided by the advertisement server 114 and/or the advertisement aggregator server 118 can be in any suitable forms. In a preferred embodiment, the advertisement content can be one or more links to the advertisement video, and the client device 106 can obtain advertisement video using the one or more links. In some embodiments, the advertisement content can also be the video stream of the advertisement. In some embodiments, the advertisement content can be one or more links to the advertisement video. The advertisement server 114 can be coupled to one or more physical storage media and/or one or more cloud storage media, which can be configured to store data for the advertisement server 114. In some embodiments, the advertisement servers 114 are maintained by advertisement agencies or advertisement services. Non-limiting examples of advertisement agencies include adHub, Tremor, YuMe, DoubleClick, and Samsung. In some embodiments, the advertisement server 114 uses protocols that conform to the VAST protocol and can receive and respond appropriately to VAST requests for advertisement segments; and the advertisement server 114 can also be referred to as a VAST server.

The network computing environment 100 may also include an advertisement aggregator server 118, which, in some embodiments, is configured to act as a front end to one or more advertisement servers 114. In some embodiments, the advertisement aggregator server 118 is also compliant with the VAST protocol.

The impression server 120 can track each time the one or more advertisement segments are played, in whole or in part, by the client device 106. FIG. 1 shows the impression server 120 as a single server; however, the impression server 120 can include more than one server. The impression server 120 can be coupled to one or more physical storage media and/or one or more cloud storage media, which can be configured to store data for the impression server 120.

The stitching server 104, the advertisement server 114, the Tums server 116, the advertisement aggregator server 118, and/or the impression server 120 can operate using operating system (OS) software. In some embodiments, the OS software is based on a Linux software kernel and runs specific applications in the stitching server 104, the advertisement server 114, the Tums server 116, the advertisement aggregator server 118, and/or the impression server 120, such as monitoring tasks and providing protocol stacks. The OS software allows resources to be allocated separately for control and data paths. For example, certain packet accelerator cards and packet services cards are dedicated to performing routing or security control functions, while other packet accelerator cards/packet services cards are dedicated to processing network traffic. As network requirements change, hardware resources can be dynamically deployed to meet the requirements in some embodiments.

FIG. 1 shows two embodiments of cloud storage 110 and 112. Cloud storage 110 and/or 112 can store data from physical storage medium 104*a* and/or 116*a* with the same restrictions, security measures, authentication measures, policies, and other features associated with the physical storage medium 104*a* and 116*a*. While FIG. 1 shows the cloud storage 112 separate from the communication network 102, cloud storage 112 can also be part of communication network 102 or another communication network. For example, the stitching server 104 can use only cloud storage 110, only cloud storage 112, or both cloud storages 110 and 112. Similarly, the Tums server 116 can be coupled to only cloud storage 110, only cloud storage 112, or both cloud storages 110 and 112. Cloud storage 110 and/or 112 can also store data for other components of the networked computing environment 100. While FIG. 1 shows one cloud storage 110 and one cloud storage 112, more than one cloud storage 110 and/or more than one cloud storage 112 or any suitable combination thereof can be used.

The communication network 102 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. While FIG. 1 shows the network 102 as a single network, the network 102 can also include multiple interconnected networks listed above.

Figure 6:
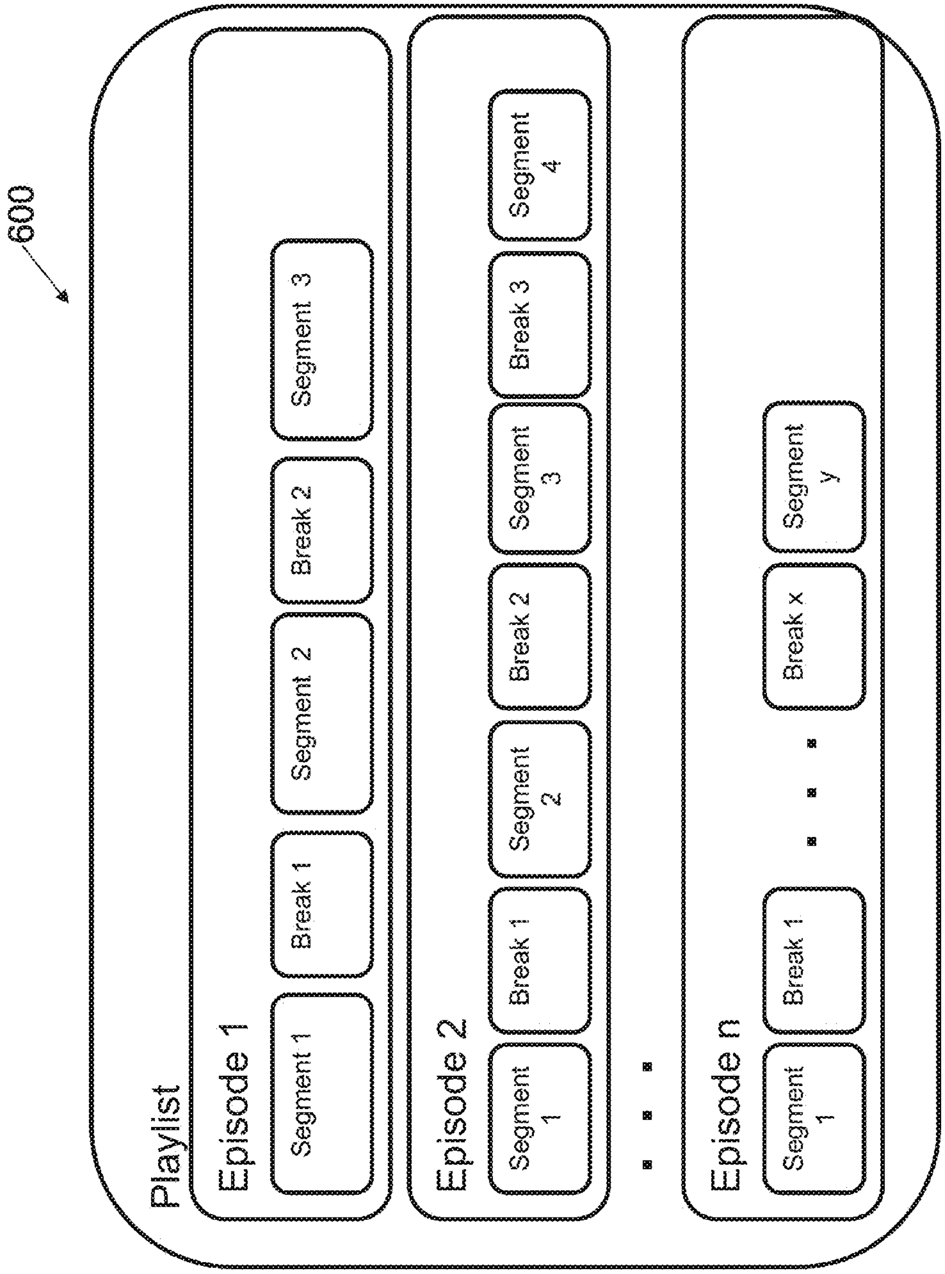
FIG. 6 illustrates a representation of a playlist comprising a plurality of separate episodes, according to some embodiments of the disclosed subject matter.

In the network computing environment 100, the stitching server 104 provides the client de vice 106 with a playlist. In some embodiments, the playlist corresponds to one or more episodes, and each episode includes one or more video segments and one or more breaks. For example, FIG. 6 shows a representation of a playlist comprising a plurality of separate episodes. Each episode contains multiple segments, separated by breaks. Each break generally contains one or more advertisement segments, where the advertisement segments can include commercial advertisement and/or public announcements. Each break is also referred to as an advertisement break or an AdBreak. Appendix A shows an example of the data structure for a playlist that is received by the client device 106 from the stitching server 104. Both Appendix A and Appendix B are incorporated herein in their entireties, and they are non-limiting examples of certain aspects of the disclosed invention. In Appendix A, the exemplary playlist includes three advertisement breaks, which are represented by the following data structure:

```
{
  "URL": "http://tums.portico.net2.tv/ad-breaks/
  5249feb40a32670000072df5.json",
  "_type": "AdBreak"
},
```

In this example, each advertisement break is indicated by the type "AdBreak," and includes a uniform resource locator (URL) to the Tums server 116 requesting advertisement content. In some embodiments, links other than the URL may also be used. Once the Tums server 116 receives the request from the client device 106, it will respond to this request by calling advertisement content on behalf of the client device 106 and generate a response for the client device 106. The process of how the Tums server 116 responds to an advertisement request from a client device 106 and returns advertisement content to the client device 106 is described in detail in connection with FIG. 2.

Figure 2:
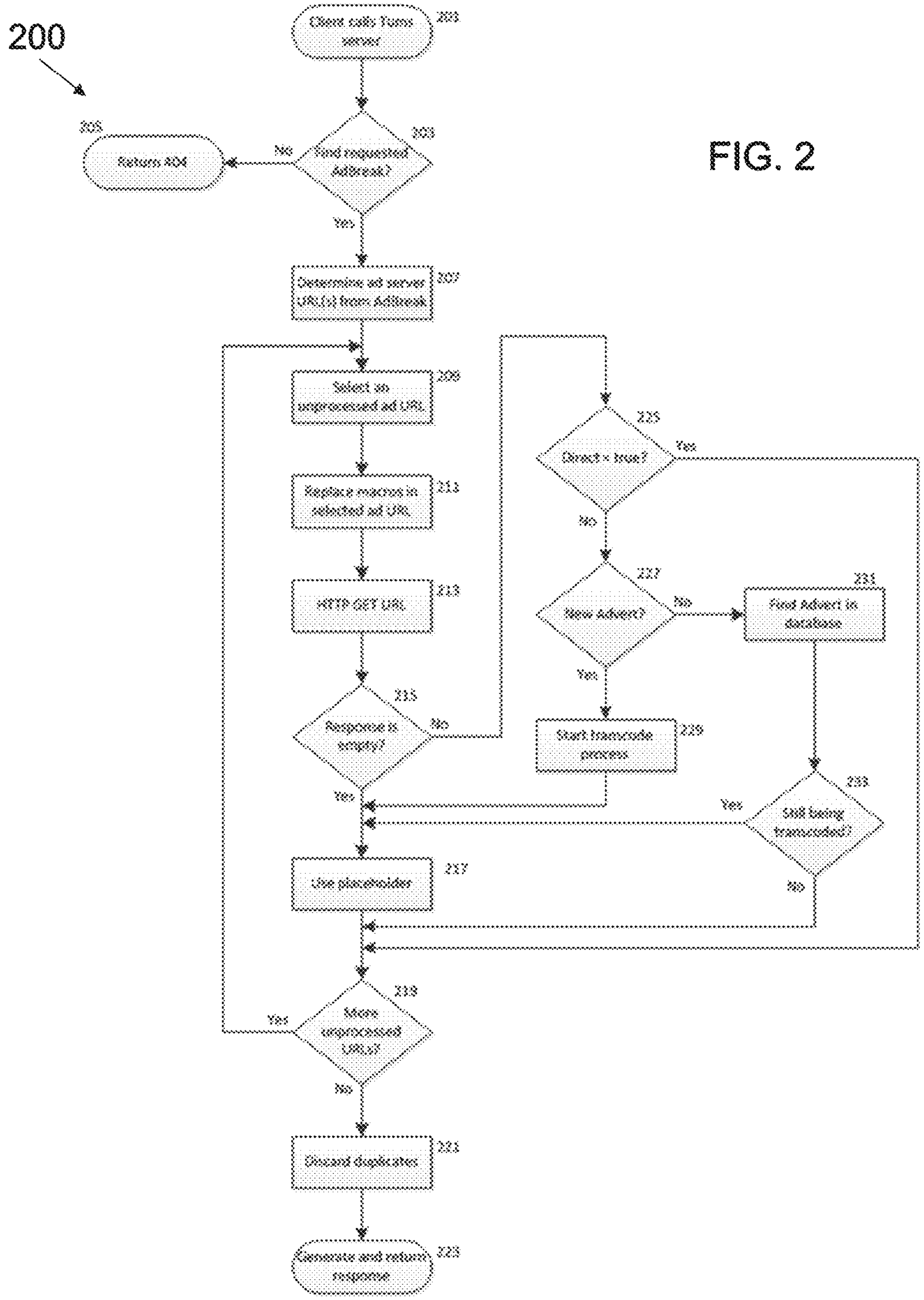
FIG. 2 illustrates a computerized process of providing advertisement content by an advertisement-calling proxy server, according to some embodiments of the disclosed subject matter.

FIG. 2 shows a flow diagram illustrating a computerized process 200 of providing advertisement content by an advertisement-calling proxy server, according to some embodiments of the disclosed subject matter. The computerized process 200 is illustrated in connection with the networked computing environment 100 shown in FIG. 1. The computerized process 200 can be modified by, for example, having steps rearranged, changed, added, and/or removed. Although the computerized process 200 is illustrated in connection with protocols and advertisement servers that are in compliance with the VAST protocol, other VAST non-compliant protocols and/or advertisements servers can also be applied to the current invention.

The computerized process 200 starts at step 201. At step 201, the Tums server 116 receives a request from a client device 106 to receive advertisement content. In some embodiments, the request is in the form of a Hypertext Transfer Protocol (HTTP) GET request to a Tums server 116 and has the syntax of "/ad-break/:id.json." The request is sent to a Tums server 116 for break data with an identification (ID) number. For example, in Appendix A, the request has a URL of "http://tums.portico.net2.tv/ad-breaks/5249FEB40A32670000072DF5.json." This URL means the request from the client device 106 is sent to a Tums server 116 at tums.portico.net2.tv, and the request is for AdBreak data with the ID number 5249FEB40A32670000072DF5. Although the exemplary request is illustrated in JavaScript Object Notation (JSON) format, other suitable formats can also be used.

The request can also include one or more types of client information. For example, The /ad-breaks/:id.json URL may include the following query parameters: "&clientid=xxxxx," where "xxxxx" refers to the unique client ID of the client device 106 that is making the request. When the Tums server 116 receives the request, the client ID associated with the request will be looked up by the Tums server 116 in a database to retrieve a record that indicates the device type of the client device 106. The device type information can be used to customize advertisement content for different client devices 106.

In some embodiments, the /ad-breaks/:id.json URL can include the following optional query parameter to alter the behavior of the request: "&direct=true." If this parameter is set, then the client device 106 can play advertisement videos directly from the advertiser based on the response provided by the Tums server 116. If the direct mode flag is not set, it means that the client device 106 would like the Tums server 116 to return a response corresponding to the advertisement video only after the video has been transcoded. Transcoding videos can avoid the slowdown that can occur during playback in certain client devices 106 when switching between videos having different formats. By transcoding all videos, including both primary content and advertisement, to the same format, the Tums server 116 can speed up the playback on those devices that experience such slowdowns.

In some embodiments, the /ad-breaks/:id.json URL can additionally or alternatively include the following optional query parameter to alter the behavior of the request: "&deviceType=xxx." If this parameter is set, then the device type indicated by the "deviceType" parameter overrides the device type indicated by the "clientid" parameter.

Once the Tums server 116 receives the request from the client device 106 for advertisement content, the computerized process 200 proceeds to step 203. At step 203, the Tums server 116 determines whether or not it can locate break data based on the request. The break data are also referred to as AdBreak. The Tums server 116 locates AdBreak based on the ID associated with the request. For example, the request "http://tums.portico.net2.tv/ad-breaks/5249FEB40A32670000072DF5.json" relates to the AdBreak with the ID "5249FEB40A32670000072DF5." The AdBreak can be stored in one or more databases that are associated with the Tums server 116. The one or more databases can be located in the same physical location as the Tums server 116, at a remote location, or any other suitable location or combination of locations. If the Tums server 116 cannot locate the requested AdBreak, the computerized process 200 then proceeds to step 205, and the Tums server 116 can return an error message. If the Tums server 116 can locate the requested AdBreak, the computerized process 200 then proceeds to step 207.

At step 207, the Tums server 116 retrieves AdBreak and extracts from the retrieved AdBreak one or more stored links to be used to request advertisement content from one or more advertisement servers 114. Although links illustrated in connection with the computerized process 200 are URLs, other types of links can also be used. In some embodiments, the Tums server 116 needs to select one or more links from the stored links based on the client information associated with the request from the client device 106. In one embodiment, an AdBreak can be represented with the following structure:

```
AdBreak:
{
        _id : <unique ID>
        VASTTags : <array of URLs to VAST servers>
        platforms : <array of optional Platform-specific VAST servers>
}
```

The "unique ID" is an ID associated with the requested AdBreak. In the previous example, "5249FEB40A32670000072DF5" is the unique ID for the AdBreak.

The VASTTags data structure is an array of one or more URLs to VAST-compliant advertisement servers, where each URL is called (a "VAST call") to retrieve advertisement content for an AdBreak. The AdBreak data can contain one or more VASTTags. Depending on the VAST server and the configuration of the URL, each VAST call can return advertisement content corresponding to zero, one, or more advertisement segments. At later steps of the computerized process 200, the returned advertisement content can be provided to the client device 106 and inserted into the playlist of the client device 106. In some embodiments, the VASTTags can be replaced with other URLs that call advertisement servers using protocols other than the VAST protocol.

As a non-limiting example, if an advertisement break in the playlist needs two advertisements, then a corresponding AdBreak entry can be created with two URLs in the VASTTags array. These two URLs may request advertisements from the same or different advertisement servers 114. The AdBreak entry is then assigned an ID and stored in an AdBreak database. When a client device 106 plays a playlist that contains an AdBreak with this ID, the client device 106 will send a request to the Tums server 116, and the request contains the ID of the AdBreak. The Tums server 116 will then retrieve the identified AdBreak from the database, request an advertisement from each of the URLs, and return a single response to the client with advertisement content corresponding to the two advertisements.

The VASTTags data structure lists the URL or URLs that are used by default for the AdBreak. In some cases, the default URLs listed in the VASTTags data structure can be replaced with URLs that are specific to a named partner. For example, the Tums server 116 could be configured such that every $n^{th}$ advertisement that runs in a client device 106 playing on a certain brand and/or type of device (e.g., Samsung) should request an advertisement from a particular advertisement server 114. This information for the AdBreak is stored in the platforms data structure in the AdBreak. In one embodiment, the platforms can be represented with the following structure:

```
AdBreak.platforms:
{
        platform : <String> // name of the platform
        adSplits : <Array of ad split information>
        [
          {
                split : <Number>      // Frequency to use this url
                url : <String>        // VAST URL
          }
        ]
```

In particular, the "url" field within the adSplits data structure lists URL or URLs that are alternative to the default URL or URLs listed in the VASTTags structure, and the "split" field specifies the frequency to use the alternative URL or URLs. The "platform" can indicate a device type and/or brand (e.g., Samsung client devices). For example, if the number in the "split" field is 5, then the alternative URL or URLs listed in the adSplits data structure will be used once in every five times the AdBreak is requested by a client device 106, provided the client device 106 satisfies the device type and/or brand requirement indicated by the platform.

An exemplary AdBreak is illustrated below:

```
{
 "_id": { "$oid" : "5249FEB40A32670000072DF5" },
 "_type": "AdBreak",
 "VASTTags": [
  {
   "url":
"http://ad5.liverail.com/?LR_PUBLISHER_ID=24062&LR_SCHEMA=vast2&LR_TITLE=PORTICO
&LR_USERAGENT=[ua]&LR_IP=[IP]&&LR_VIDEO_ID=PORTICO&LR_AUTOPLAY
=0&LR_MUTED=0&LR_FORMAT=video/mp4&LR_VERTICALS=[device]",
    "_id": { "$oid" : "53BDB474309B45A56902C883" }
  },
  {
```

-continued

"url":
"http://ad5.liverail.com/?LR__PUBLISHER__ID=24062&LR__SCHEMA=vast2&LR__TITLE=PORTICO
&LR__USERAGENT=[ua]&LR__IP=[IP]&&LR__VIDEO__ID=PORTICO&LR__AUTOPLAY
=0&LR__MUTED=0&LR__FORMAT=video/mp4&LR__VERTICALS=[device]",
"__id": { "$oid" : "5409DC91B87214276C2BC76E" }
}
],
"__v": 0,
"channelName": "Net2TV Ad Tags",
"duration": 0,
"platforms": [
{
"platform": "samsung",
"__id": { "$oid" : "5412059AFD78A0D420D61554" },
"adSplits": [
{
"url": "http://p3-stg-mch-ad-ex-501364671.us-west-
1.elb.amazonaws.com/api/tva/1.0/request?id=xv0e00000019wm&s={samsung__screensize}&i
=[IP]&dt={samsung__dt}&did={samsung__did}&pt={samsung__pt}&pv={samsung__pv}&nt={
samsung__nt}&coc={samsung__coc}&lnc={samsung__lnc}&ts={samsung__ts}&tz={samsung__tz
}&scr={samsung__scr}&md={samsung__md}&dy={samsung__dy}",
"split": 4,
"__id": { "$oid" : "5412059AFD78A0D420D61555" }
}
]
}
],
"provider": "Net2TV",
"title": "Net2TV Ad Break"
}

The exemplary AdBreak shown above indicates, among others, that the AdBreak with ID 5249FEB40A32670000072DF5 will show two advertisements per advertisement break (because the sample VAST-Tags data structure has two URLs); however, if the request is sent from a Samsung client device, then the Tums server 116 will instead make a request to the alternative URL once in every four requests from the Samsung client device (because the platform data structure has "Samsung" as the platform and "4" as the split frequency).

After the Tums server 116 determines one or more links (e.g., URLs) to be used to request advertisement content from one or more advertisement servers 114, the computerized process 200 proceeds to step 209. At step 209, the Tums server selects an unprocessed link to be used to request advertisement content from the advertisement server 114. If all links are not processed yet, then the Tums server 116 can select the first unprocessed link; otherwise the Tums server 116 can select the next unprocessed link. The computerized process 200 then proceeds to step 211.

At step 211, the Tums server 116 determines if the link that the Tums server 116 selects to call at step 209 contains any dynamic parameters. If the link contains any dynamic parameters, the Tums server 116 replaces any such dynamic parameters with real values. The dynamic parameters are also referred to as macros or placeholder macros. These macros are replaced dynamically with real values by the Tums server 116 and/or parameters included with the request from the client device 106. When the Tums server 116 uses the selected URL to make advertisement requests from the advertisement server 114, these real values inlcuded in the URL are typically used by the advertisement server 114 as part of its dynamic decision-making system to determine which advertisement to return for the advertisement request. Some non-limiting examples of macros and their corresponding type of values are shown below.

Specifcially, Table I shows some generic macros. In Table I, the macros can be replaced with real values that can be determined from the request sent form the client device 106.

TABLE I

Examples of generic macros with corresponding real values

| Macro | Exempalry Values Can Be Used to Replace Marco |
|---|---|
| [ua] | User-Agent of client's HTTP request |
| [timestamp] | Time of request |
| [referrer__url] | "portico.tv" |
| [IP] | IP address of client device |
| [device] | devicePlatform ("samsung", "roku", "philips" . . .) |

Table II shows some macros that are specific to Samsung devices. In Table II, the macros can be replaced with corresponding query paramaters and real values that can be determined from the request sent from the client device 106.

TABLE II

Examples of Samsung-specific macros with corresponding query parameters and real values

| Macro | Replaced with query parameter | Note/Real values |
|---|---|---|
| {samsung__screensize} | s | screen size |
| {samsung__dt} | dt | Device type (e.g., tv = 3) |
| {samsung__dy} | dy | Year of Device |
| {samsung__did} | did | Unique device id |
| {samsung__pv} | pv | platform version |
| {samsung__md} | md | model number |
| {samsung__pt} | pt | Ad product type |
| {samsung__nt} | nt | network type |
| {samsung__coc} | coc | country code |
| {samsung__lnc} | lnc | language code |
| {samsung__ts} | ts | Timestamp |
| {samsung__tz} | tz | time zone |
| {samsung__scr} | scr | also screen size |

As a non-limiting example, if a request from the client device 106 to the Tums server 116 is "http://tums.portico.net2.tv/ad-breaks/5249FEB40A32670000072

DF5.json&clientid=Roku-123456," then, according to the exemplary AdBreak (shown above) with ID "5249FEB40A32670000072DF5," one of the links used by the Tums server 116 can be "http://ad5.1iverail.com/?LR_PUBLISHER_ID=24062&LR_SCHEMA=vast2&LR_TITLE=PORTICO&LR_USERAGENT=[ua]&LR_IP=[IP]&&LR_VIDEO_ID=PORTICO&LR_AUTOPLAY=0&LR_MUTED=0&LR_FORMAT=video/mp4&LR_VERTICALS=[device]." If the Tums server 116 determines that the request is from a device with IP address 75.103.26.138 and the user agent of the HTTP request is "Roku 3XS," then the Tums server 116 replaces the previous link with the following link by replacing any dynamic parameters with real values: http://ad5.1iverail.com/?LR_PUBLISHER_ID=24062&LR_SCHEMA=vast2&LR_TITLE=PORTICO&LR_USERAGENT=Roku%2f3XS&LR_IP=75.102.26.138&&LR_VIDEO_ID=PORTICO&LR_AUTOPLAY=0&LR_MUTED=0&LR_FORMAT=video/mp4&LR_VERTICALS=Roku.

As another non-limiting example, if a request from the client device 106 to the Tums server is "http://tums.portico.net2.tv/ad-breaks/5249FEB40A32670000072DF5.json&clientid=Samsung-123456&s=1280x720&dt=3&dy=2013& . . . "(Note: this request link is for illustration purpose and may include additional parameters and/or values), and this is the 4$^{th}$ request from the client device 106, then, according to the exemplary AdBreak (shown above) with ID "5249FEB40A32670000072DF5," one of the links used by the Tums server 116 can be "http://p3-stg-mch-ad-ex-501364671.us-west-1.elb.amazonaws.com/api/tva/1.0/request?id=xv0e00000019wm&s={samsung_screensize}&i=[IP]&dt={samsung_dt}&did={samsung_did}&pt={samsung_pt}&pv={samsung_pv}&nt={samsung_nt}&coc={samsung_coc}&lnc={samsung_lnc}&ts={samsung_ts}&tz={samsung_tz}&scr={samsung_scr}&md={samsung_md}&dy={samsung_dy}." If the Tums server 116 determines that the request is from a device with IP address 75.103.26.138 and the user agent of the HTTP request is "SamsungTV," then the Tums server 116 replaces the previous link with the following link by replacing any dynamic parameters/macros with real values and query parameters included with the request: "http://p3-stg-mch-ad-ex-501364671.us-west-1.elb.amazonaws.com/api/tva/1.0/request?id=xv0e00000019wm&s=1280x720&i=75.103.26.138&dt=3&did=Samsung-123456& . . . " (Note: this link is for illustration purpose and may include additional fields).

After the Tums server 116 replaces dynamic parameters/macros with real values and/or query parameters at step 211, the computerized process 200 proceeds to step 213. At step 213, the Tums server 116 requests to retrieve advertisement content from the advertisement server 114, as specified by the link (e.g., URL) extracted from the AdBreak in previous steps. In some embodiments, the requested advertisement content can include one or more segments. In some embodiments, the request is in HTTP GET format. In some embodiments, The advertisement server 114 can be maintained by an advertisement agency such as, for example, adHub, YuMe, Tremor, or any other agency that maintains an advertisement server. In some embodiments, the advertisement server 114 can be maintained by an advertisement aggregation service, such as LiveRail. For example, the Tums server 116 can send request to the advertisement aggregator server 118, which can in turn request advertisement from one or more advertisement servers 114. Although the computerized process 200 is illustrated that the Tums server 116 receives response from the advertisement server 104, the Tums server 116 can also receive response from the advertisement aggregator server 118 and/or any other suitable servers. All that matters is that the server is configured to recognize and respond properly to advertisement requests from the Tums server 116. In a preferred embodiment, the advertisement server 114 is configured to recognize and respond to advertisement requests made in accordance with the VAST protocol, but any other advertisement serving protocols could be used. The computerized process 200 then proceeds to step 215.

At step 215, the Tums server 116 receives a response to the advertisement request from the advertisement server 114. In some embodiments, the Tums server 116 receives a response to the advertisement request via the advertisement aggregator server 118. The Tums server 116 can further determine if the response to the request is empty, or if the request has timed out. If the response is empty or timed out, the computerized process 200 proceeds to step 217, where the Tums server 116 selects a "placeholder" video, which can be an advertisement. If the response is not empty, the computerized process 200 proceeds to step 225. In some embodiments, the response from the advertisement server 114 includes one or more links (e.g., URLs) to one or more advertisement segments, and the links can be played by the client device 106. In some embodiments, the response can also include one or more impression links corresponding to the one or more advertisement segments included in the response returned by the advertisement server 114. The impression links can be used by the client device 106 to notify a server, such as the advertisement server 114, the Tums server 116, the impression server 120, and/or any other suitable servers, each time the corresponding advertisement segment is played, in whole or in part, by the client device 106. For example, in some embodiments, four impression links can be used to indicate an advertisement video has been played 25%, 50%, 75%, and 100%, respectively. Standards defining when event URLs (e.g., impression links) can be triggered based on advertisement viewing are promulgated by the Interactive Advertising Bureau, and include such documents as the "Digital Video Ad Impression Measurement Guidelines" (Formerly titled "Broadband Video Commercial Measurement Guidelines"), updated December 2009, and the "Interactive Audience Measurement and Advertising Campaign Reporting and Audit Guidelines, Global Version," Version 6.0b, September 2004, which are incorporated herein by reference.

At step 217, the Tums server 116 processes the response form the advertisement server 114 by replacing the empty or timed-out response with one of placeholder advertisement videos. The placeholder advertisement videos are stored in the local cache of the Tums server 116 or any of the databases associated with the Tums server 116. In a preferred embodiment, the Tums server 116 returns one or more links to the placeholder videos to the client device 106. In some embodiments, the Tums server 116 can return one or more placeholder videos directly to the client device 106. The computerized process 200 then proceeds to step 219.

At sept 219, the Tums server 116 determines if the AdBreak contains additional links to process. If there are more links to process, the computerized process 200 returns to step 209; otherwise the computerized process 200 proceeds to step 221.

At step 221, the Tums server 116 checks for, and discards, any advertisements that are duplicates. Optionally, at this step, the Tums server 116 can also identify and remove advertisements that are not duplicates but are from the same advertising campaign (an advertising campaign can include several advertisements that share the same idea and/or objective). To identify such advertisements that are from the same advertising campaign, but not duplicates, the Tums server 116 can look for certain repeated string patterns in the URL for the advertisement. The Tums server 116 usually needs to be notified in advance by the advertisement agency of the repeated string patterns to look for to identify advertisements that belong to the same advertising campaign. The computerized process 200 then proceeds to step 223.

At step 223, the Tums server 116 generates a final response based on the one or more responses received from the advertising server 114. The Tums server 116 then returns the final response to the calling client device 106. The final response is based on the response received from the advertising server 114, but may or may not be the same as that received response Appendix B shows an exemplary response that is provided to the client device 106 by the Tums server 116. During playback, the client device 106 will replace the AdBreaks (for example, the AdBreak in Appendix A) with the responses from the Tums server 116. As can be seen from Appendix B, in some embodiments, the response from the Tums server 116 includes the same data structure as the "Content" objects in the playlist (e.g., Appendix A), making it simple to insert the dynamic advertisements into the playlist. In a preferred embodiment, the final response is formatted as a JSON document, but alternative formats could be used. In some embodiments, in addition to the impression links returned by the advertisement server 114, the Tums server 116 adds another set of impression links to the final response. One or more impression links in the set of impression links can correspond to an advertisement segment included in the final response, where the advertisement segment can correspond to either the response returned by the advertisement server 114 (or by the advertisement aggregator server 118) or to the one or more placeholder advertisement videos selected by the Tums server 116. The set of impression links can be used by the client device 106 to notify the Tums server 116 and/or any other suitable servers each time the corresponding advertisement segment is played, in whole or in part, by the client device 106.

At step 215, if the Tums server 116 determines that the response from the advertisement server 114 is not empty, then it checks, at step 225, whether the direct mode is set in the original request from the client device 106. In some embodiments, the direct mode can be indicated by setting "&direct=true" in the request URL. The direct mode allows the client device 106 to play advertisement videos directly from the advertiser. If the direct mode flag is not set, it means that the client device 106 would like the Tums server 116 to return a response corresponding to the advertisement video only after the video has been transcoded. Transcoding videos can avoid the slowdown that can occur during playback in certain client devices 106 when switching between videos having different formats. By transcoding all videos, including both primary content and advertisement, to the same format, the Tums server 116 can speed up the playback on those devices that experience such slowdowns. If the direct mode is set, then the computerized process 200 proceeds to step 219, as described above. If the direct mode is not set, then it means that the client device 106 would like the Tums server 116 to return a response corresponding to an advertisement video after it has been transcoded, so the computerized process 200 proceeds to step 227.

At step 227, the Tums server 116 determines if the retrieved video from the advertisement server 114 is for an advertisement that the Tums server 116 has not processed before. If the advertisement is new to the Tums server 116, the computerized process 200 proceeds to step 229; otherwise the computerized process 200 proceeds to step 231.

At step 229, the Tums server 116 starts the transcoding process. The transcoding process can take some time, and the Tums server 116 generally cannot wait until the transcoding has finished without risking a potential stall of the video playback by the client device 106. Therefore, instead of waiting for the transcoding to finish, the Tums server 116 proceeds to step 217 and selects a placeholder advertisement from its local cache.

At step 231, because, at step 227, the Tums server 116 determines that the advertisement is not a new one to the Tums server 116, the Tums server 116 looks the advertisement up in the database associated with the Tums server 116. The computerized process 200 then proceeds to step 233.

At step 233, the Tums server 116 determines if the advertisement has been fully transcoded already, or is still in the process of being transcoded (for example, in response to a previous transcoding request). If the advertisement video is still in the process of being transcoded, then the Tums server returns to step 217 to select a placeholder advertisement video. If the advertisement video has been fully transcoded, then the Tums server uses the advertisement video that has been stored in the database.

Figure 3:
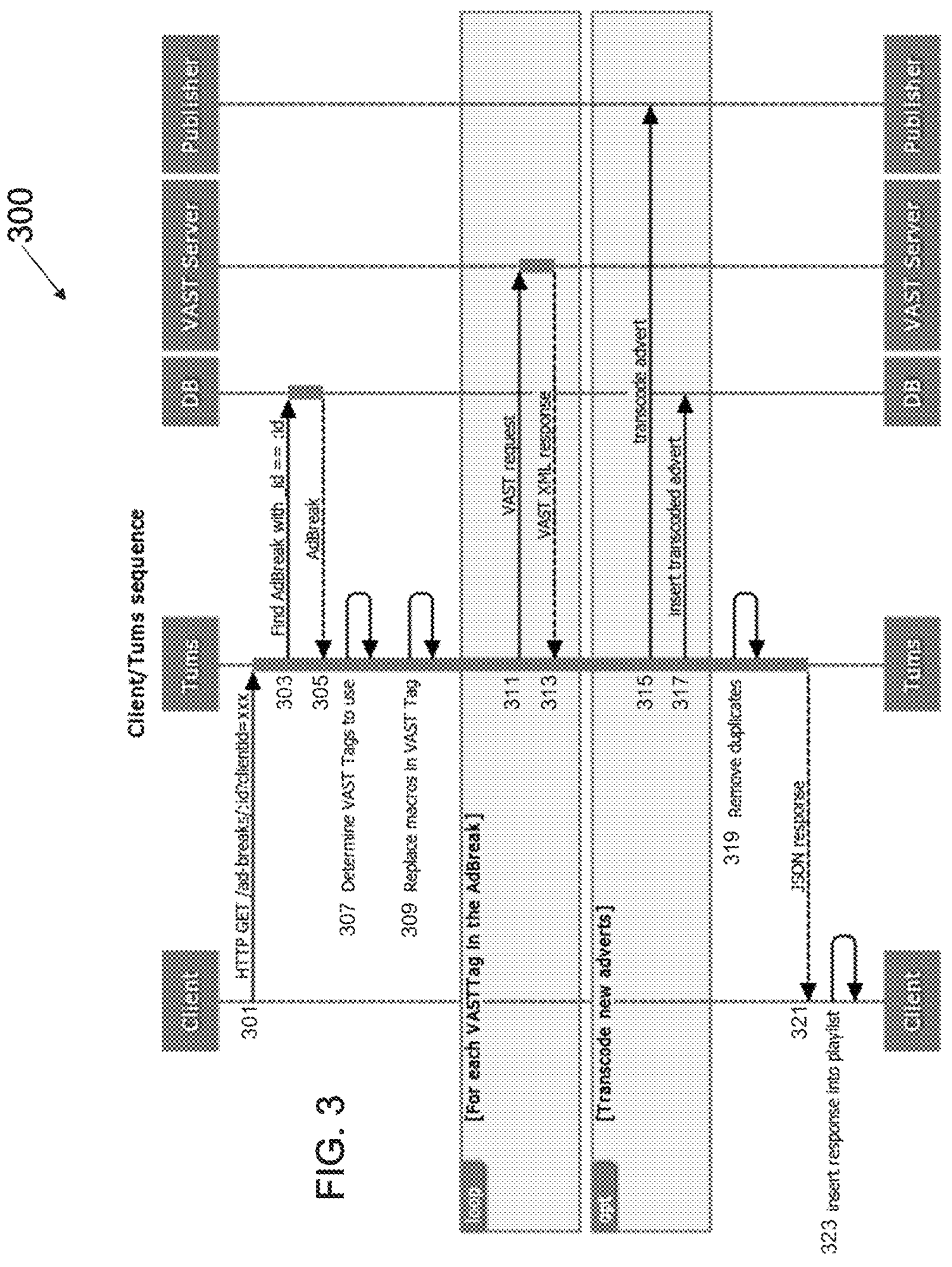
FIG. 3 illustrates a sequence diagram showing the steps of a computerized process executed by one or more components of a networked computing environment, according to some embodiments of the disclosed subject matter.

FIG. 3 illustrates a sequence diagram showing the steps of the computerized process 300 executed by one or more components of the networked computing environment 100 according to one embodiment. The computerized process 300 is illustrated in connection with the networked computing environment 100 shown in FIG. 1. The computerized process 300 can be modified by, for example, having steps rearranged, changed, added, and/or removed. Some steps in the computerized processes 200 and 300 are more or less the same, so the detailed descriptions of the steps of the computerized process 300 can be referred to in connection with the description of FIG. 2.

The computerized process 300 starts at step 301, where the client device 106 sends to the Tums server 116 an HTTP GET request for advertisement content, which may correspond to one or more advertisements. The GET request includes an ID of the client device and an ID of the desired AdBreak as described above. In some embodiments, the request can be in a format other than an HTTP GET format.

At steps 303 and 305, the Tums server 116 finds and retrieves the identified AdBreak from its database. As described above, the ID of the AdBreak is included with the request from the client device 106. Further, the database of the Tums server 116 can be located in the same physical location as the Tums server 116, at a remote location, or any other suitable location or combination of locations.

At steps 307 and 309, the Tums server 116 extracts the URLs for each advertisement from the retrieved AdBreak, and replaces the macros (also referred to herein as URL variables or dynamic parameters) with real values and/or query parameters. As described above, the URLs can be selected based on the device information of the client device 106.

At step 311, for each extracted URL, the Tums server 116 requests an advertisement from an advertisement server 114. The advertisement server 114 can be maintained by an ad agency such as, for example, adHub, YuMe, Tremor, or any other agency that maintains an ad server. Or, the ad server can be maintained by an advertisement aggregation service, such as LiveRail. All that matters is that the server is configured to recognize and respond properly to advertisement requests which have been properly formatted in an advertisement serving protocol such as, but not limited to, the VAST protocol. In a preferred embodiment, in response to the request at step 311, the advertisement server 114 returns a URL of a selected advertisement. Although FIG. 3 indicates that the request at step 311 is a VAST request, the request can also comply with other advertising protocols. Further, although FIG. 3 indicates that the response at step 313 is in XML format, other formats are also within the scope and spirit of the current invention.

At step 315, if the client device 106 has not set the "direct" flag to true, the Tums server 116 sends the URL of the selected advertisement to a publisher process for transcoding. The publisher process then transcodes the advertisement and, at step 317, the transcoded advertisement is stored into the database of the Tums server 116.

At step 319, the Tums server 116 removes advertisements that are duplicates. Optionally, at this step, the Tums server 116 can also identify and remove advertisements that are from the same advertising campaign.

At step 321, in a preferred embodiment, the response is formatted as a JSON document containing URLs for the selected (and transcoded, if the direct flag is not true) advertisement videos, and returns the response to the calling client device 106.

At step 323, the client device 106 can insert the response received from the Tums server 116 into the playlist. In some embodiments, the Tums server 116 returns the response to the stitching server 104 at step 321, and the stitching server 104 stitches the response into a playlist that is played by the client device 106.

Figure 4:
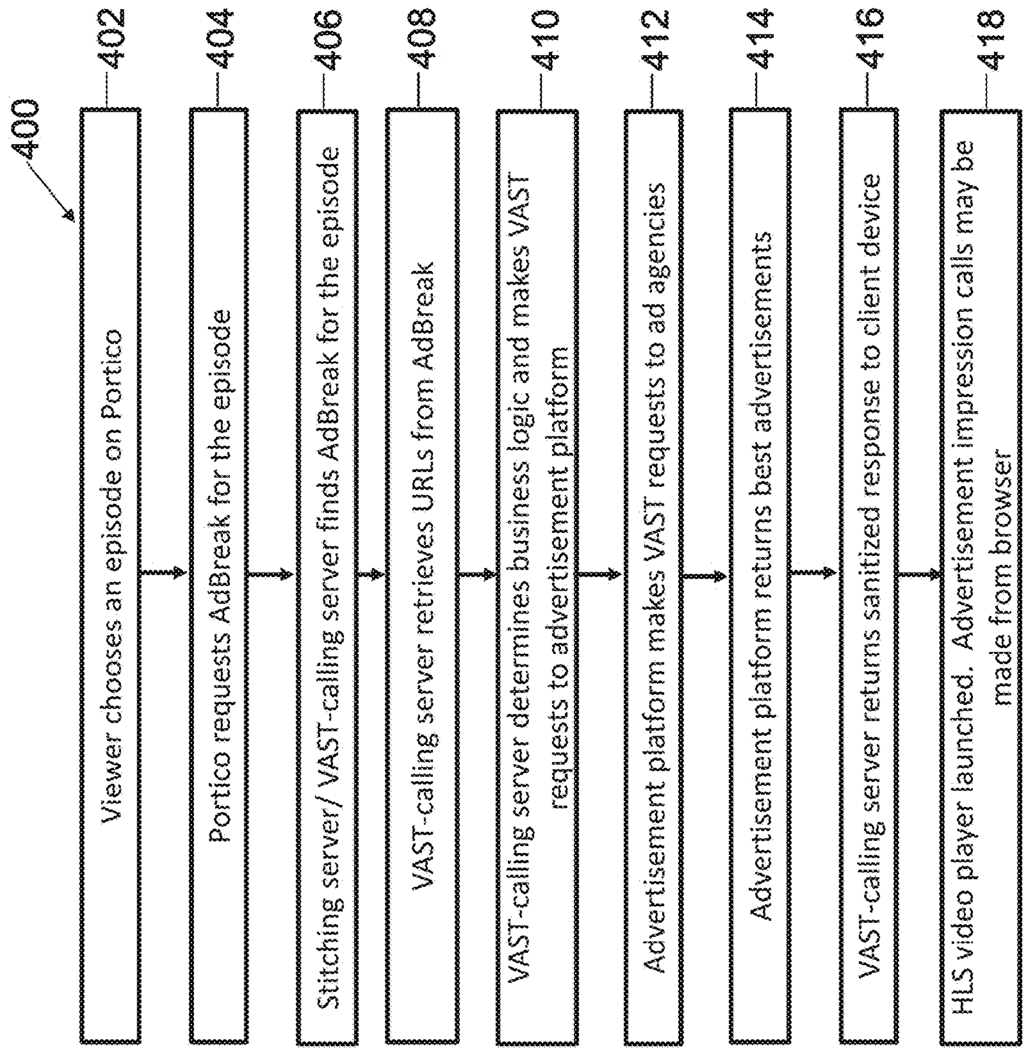
FIG. 4 shows a flow diagram illustrating a computerized process of dynamically calling and returning advertisements for a client device, according to some embodiments of the disclosed subject matter.

FIG. 4 shows a flow diagram illustrating a computerized process 400 of dynamically calling and returning advertisements for a client device 106, according to some embodiments of the disclosed subject matter. The computerized process 400 can be modified by, for example, having steps rearranged, changed, added, and/or removed. Although in FIG. 4 the stitching server 104 and the Tums server (VAST-calling server) 116 are described as two separate servers, they can be the same server or located at the same location. Although the computerized process 400 is illustrated in connection with the HLS streaming protocol, other suitable protocols can also be applied to the current invention.

At step 402, the viewer chooses to play an episode from a client device 106. In this particular example, the client device 106 is a Portico media player provided by Net2TV, but any other suitable client devices are also within the spirit and scope of the current invention. The computerized process 400 then proceeds to step 404.

At step 404, the Portico media player requests AdBreak for the episode. In some embodiments, the request is sent to the Tums server 116 (as discussed above, the Tums server is also referred as a VAST-calling server). In some embodiments, the request is sent to the stitching server 104. The computerized process 400 then proceeds to step 406.

At step 406, the Tums server 116 finds AdBreak data based on the request. In some embodiments, if the Portico media player sends the AdBreak request to the stitching server 104, then either the stitching server 104 or the Tums server 116 can find AdBreak data based on the request. The computerized process 400 then proceeds to step 408.

At step 408, the Tums server 116 retrieves URLs to the advertisement content from the AdBreak data. In some embodiments, if the stitching server 104 finds the AdBreak data at step 406, then the stitching server 104 will send the URLs to the Tums server 116. The computerized process 400 then proceeds to step 410.

At step 410, the Tums server 116 makes a VAST request to an advertisement aggregator server 118. A non-limiting example of an advertisement aggregator is LiveRail. As discussed above, before making a VAST request, the Tums server 116 may first determine which URL to use (e.g., the default URLs from the VASTTags or the alternative device-dependent URLs from adSplit) and replace any dynamic parameters/macros with real values and/or query parameters. The computerized process 400 then proceeds to step 412.

At step 412, the advertisement aggregator server 118 makes VAST requests to one or more advertisement agencies, which include one or more advertisement server 114. Non-limiting examples of advertisement agencies include Tremor, YuMe, and Samsung. The computerized process 400 then proceeds to step 414.

At step 414, the advertisement aggregator server 118 returns a response corresponding to one or more advertisements found by the one or more advertisement agencies to the Tums server 116. In some embodiments, the advertisement aggregator server 118 may include an ad-decision engine, which can select the advertisement based on various criteria. As described above, in some embodiments, the response can also include one or more impression links corresponding to the underlying advertisement content returned by the advertisement server 114 or the advertisement aggregator server 118. The impression links can be used by the client device 106 to notify a server, such as the advertisement server 114, the Tums server 116, the impression server 120, and/or any other suitable servers, each time the corresponding advertisement segment is played, in whole or in part, by the client device 106. Although FIG. 4 shows steps 410, 412, and 414 as separate steps, in some embodiments, the Tums server 116 can directly request advertisement content from one or more advertisement servers 114 associated with the advertisement agencies, and steps 410, 412, and 414 can be combined into one or more steps. The computerized process 400 then proceeds to step 416.

At step 416, the Tums server 116 returns the response from the advertisement server 114 or the advertisement aggregator server 118 to the calling client device 106. In some embodiments, the Tums server 116 will first sanitize the response before sending it to the client device 106. For example, if the response is empty, the Tums server 116 can replace the response with a placeholder video or a link to the placeholder video. If the response needs to be transcoded and the client device also requests the response to be transcoded, then the Tums server 116 can replace the response with a placeholder video or a link to the placeholder video. As described above, the Tums server 116 can also discard any duplicates from the response. In some embodiments, in addition to the impression links returned by the advertisement server 114 or the advertisement aggregator server 118, the Tums server 116 adds another set of impression links to the response. One or more impression links in the set of impression links can correspond to an advertisement segment included in the response (including placeholder videos, if any). The set of impression links can be used by the client device 106 to notify the Tums server 116 and/or any other suitable servers each time the corresponding advertisement segment is played, in whole or in part, by the client device 106. In some embodiments, the Tums server 116 can return the response to the client device 106 via the stitching server 104. The computerized process 400 then proceeds to step 418.

At step 418, the client device 106 can play the requested advertisement content. In some embodiments, the client device 106 is a HLS compatible video player, such as the Portico media player. In some embodiments, the client device 106 will also make advertisement impression calls using the impression links included in the response sent from the Tums server 116 (either directly or via the stitching server 104).

Figure 5:
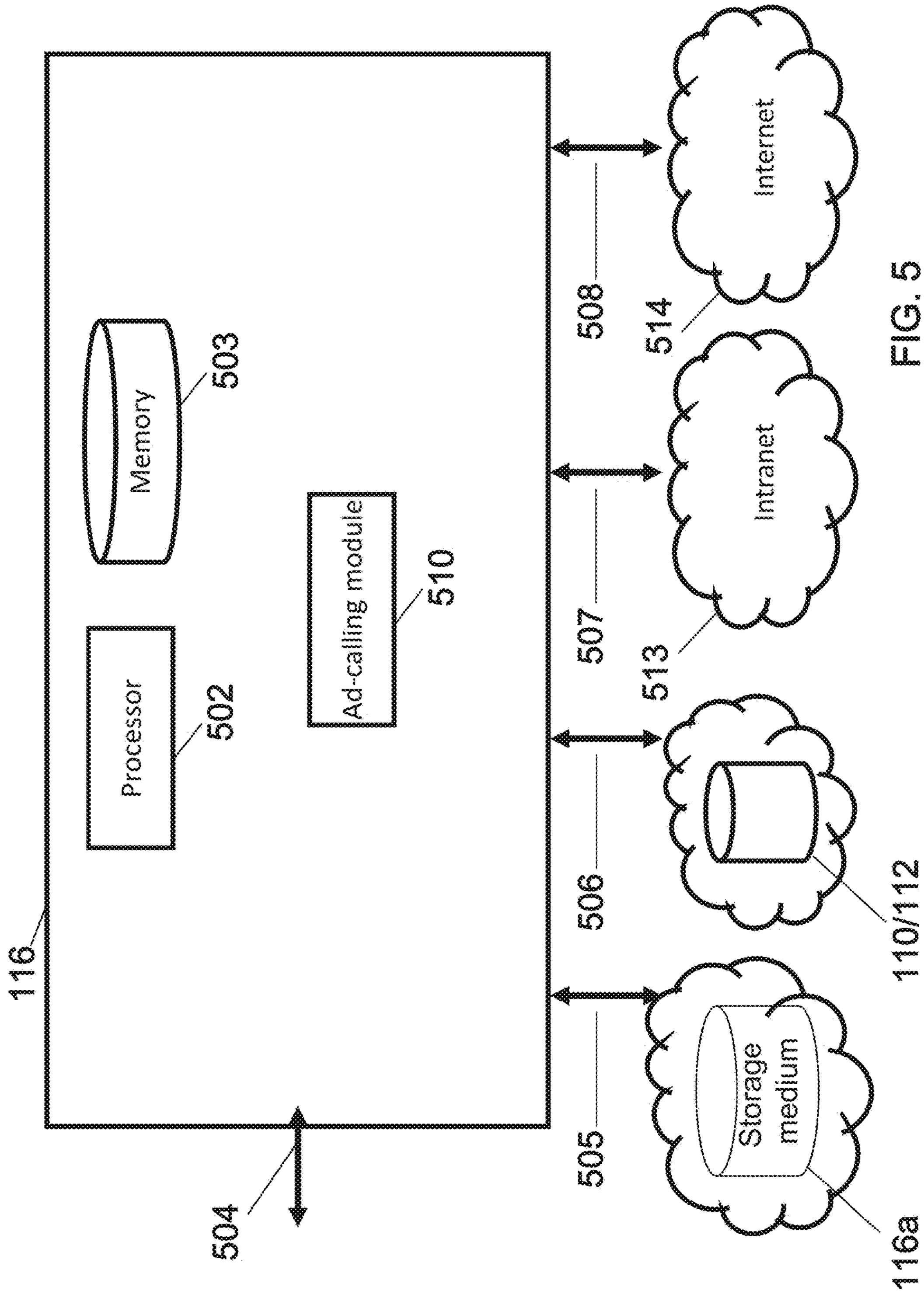
FIG. 5 illustrates a block diagram of a Tums server, according to some embodiments of the disclosed subject matter.

FIG. 5 is a block diagram of an exemplary Tums server 116 in accordance with some embodiments. The Tums server 116 includes a processor 502, a memory 503, an ad-calling module 510, and interfaces 504-508. The Tums server 116 can communicate with other servers (not shown) via the interface 504; the Tums server 116 can communicate with the local network storage 116*a* via the interface 505; the Tums server 116 can communicate with the remote network storage 110 via the interface 506; the Tums server 116 can communicate with the Intranet 513 via the interface 507; and the Tums server 116 can communicate with the Internet 514 via the interface 508. The interfaces 504-508 are shown as separate interfaces but may be the same physical interface. The Tums server 116 may include additional modules, fewer modules, or any other suitable combination of modules that perform any suitable operation or combination of operations. For example, the Tums server 116 may include more than one processor 502.

The interfaces 504-508 provide an input and/or output mechanism for communication. In some cases, the interfaces 504-508 can be used to communicate within the computing system. For example, the processor 502 can use one of the interfaces 504-508 to communicate with memory 503. In other cases, the interface 504-508 can be used to communicate over a network. The interfaces 504-508 enable communication with other computing systems, such as the stitching server 104 and advertisement servers 114, as well as other network nodes in the communication network 102. The interfaces 504-508 can be implemented in hardware to send and receive signals in a variety of mediums, such as optical, copper, and wireless, and in a number of different protocols, some of which may be non-transient.

In some embodiments, the processor 502 can include one or more cores and can accommodate one or more threads to run various applications and modules, including the ad-calling module 510.

The ad-calling module 510 can be configured to cause one or more processors to receive a request from a client device to receive advertisement content, wherein the request includes client information. The ad-calling module 510 can be configured to cause one or more processors to retrieve break data based on the request, wherein the break data includes one or more links to a server (the server can be, for example, an advertisement server 114 or an advertisement aggregator server 118). The ad-calling module 510 can be configured to cause one or more processors to replace any dynamic parameters contained in the one or more links with at least one value based on the client information. The ad-calling module 510 can be configured to cause one or more processors to request, from the server, at least one advertisement segment based on the one or more links. The ad-calling module 510 can be configured to cause one or more processors to receive, from the server, a first response to the request. The ad-calling module 510 can be configured to cause one or more processors to provide a second response to the client device, where the second response is based on the first response.

In some embodiments, the ad-calling module 510 can be implemented in software stored in the memory 503 and/or located within the memory 503. The memory 503 can be a non-transitory computer readable medium, flash memory, a magnetic disk drive, an optical drive, a programmable read-only memory (PROM), a read-only memory (ROM), or any other memory or combination of memories. The software can run on a processor 502 capable of executing computer instructions or computer code. The processor 502 might also be implemented in hardware using an application specific integrated circuit (ASIC), programmable logic array (PLA), field programmable gate array (FPGA), or any other integrated circuit. The processor 502 also communicates with the memory 503 and interfaces 504-508 to communicate with other devices. The processor 502 can be any applicable processor such as a system-on-a-chip that combines a CPU, an application processor, and flash memory.

Although the disclosed subject matter has been described and illustrated in the foregoing exemplary embodiments, it is understood that the present disclosure has been made only by way of example, and that numerous changes in the details of implementation may be made without departing from the spirit and scope, which is limited only by the claims which follow.

A "server," "client," "agent," "module," "interface," and "host" is not software per se and includes at least some tangible, non-transitory hardware that is configured to execute computer readable instructions. In addition, the phrase "based on" does not imply exclusiveness—for example, if X is based on A, X can also be based on B, C, and/or D.

Appendix A: An Example of Playlist Data

Appendix A shows a segment from an exemplary playlist for the "This Week In Time" channel: http://pepto.portico.net2.tv/v3/playlist/Time/Time.

In some embodiments, during playback, the client device (e.g., a Net2TV video player) will replace the AdBreaks included in the playlist with the responses from the Tums server 116. As can be seen from Appendix B, in a preferred embodiment, a response from the Tums server includes the same data as the Content objects in the playlist, making it simple to insert the dynamic adverts into the playlist.

```
{
 "icon": "http://statics.net2.tv/pepto/channels/Time/time.png",
 "background":
"http://statics.net2.tv/pepto/channels/Time/TIME_Background8_1280x720.jpg",
 "title": "Time",
 "playlistID": "541c8c1413347d6d6fa846a1",
 "episodes": [
  {
   "_id": "541c8bb713347d6d6fa82171",
   "duration": 1277,
   "_type": "Playlist",
   "provider": "Time",
   "channelName": "Time",
   "title": "Home Shopping in the Middle of Nowhere",
```

-continued

"description": "Risks, myths and rumors about Ebola; everything you need to know about this deadly virus. Plus, why people are travelling the earth to find homes free of cell towers and electric radiation.",
"content": [
{
"__type": "Content",
"duration": 177,
"videoURLs": {
"h5": "http://n2.tv-source-videos.s3.amazonaws.com/sourceVideos/PORTICO/NEWS/TIME/TIME__93/TIME__93__20140922__A.mov",
"mp4": {
"720p": {
"1200": "http://video.net2.tv/PORTICO/NEWS/TIME/TIME__93/TIME__93__20140922__A/TIME__93__20140922__A__1__200.mp4",
"1800": "http://video.net2.tv/PORTICO/NEWS/TIME/TIME__93/TIME__93__20140922__A/TIME__93__20140922__A__1__800.mp4",
"2500": "http://video.net2.tv/PORTICO/NEWS/TIME/TIME__93/TIME__93__20140922__A/TIME__93__20140922__A__2500.mp4"
}
},
"hlsStartingOffset": 5,
"hls": "http://video.net2.tv/PORTICO/NEWS/TIME/TIME__93/TIME__93__20140922__A/playlist.m3u8"
},
},
{
"URL": "http://tums.portico.net2.tv/ad-breaks/5249feb40a32670000072df5.json",
"__type": "AdBreak"
},
{
"__type": "Content",
"duration": 253,
"videoURLs": {
"h5": "http://n2.tv-source-videos.s3.amazonaws.com/sourceVideos/PORTICO/NEWS/TIME/TIME__93/TIME__93__20140922__B.mov",
"mp4": {
"720p": {
"1200": "http://video.net2.tv/PORTICO/NEWS/TIME/TIME__93/TIME__93__20140922__B/TIME__93__20140922__B__1200.mp4",
"1800": "http://video.net2.tv/PORTICO/NEWS/TIME/TIME__93/TIME__93__20140922__B/TIME__93__20140922__B__1800.mp4",
"2500": "http://video.net2.tv/PORTICO/NEWS/TIME/TIME__93/TIME__93__20140922__B/TIME__93__20140922__B__2500.mp4"
}
},
"hlsStartingOffset": 5,
"hls": "http://video.net2.tv/PORTICO/NEWS/TIME/TIME__93/TIME__93__20140922__B/playlist.m3u8"
},
},
{
"URL": "http://tums.portico.net2.tv/ad-breaks/5249feb40a32670000072df5.json",
"__type": "AdBreak"
},
{
"__type": "Content",
"duration": 524,
"videoURLs": {
"h5": "http://n2.tv-source-videos.s3.amazonaws.com/sourceVideos/PORTICO/NEWS/TIME/TIME__93/TIME__93__20140922__C.mov",
"mp4": {
"720p": {
"1200": "http://video.net2.tv/PORTICO/NEWS/TIME/TIME__93/TIME__93__20140922__C/TIME__93__20140922__C__1200.mp4",
"1800": "http://video.net2.tv/PORTICO/NEWS/TIME/TIME__93/TIME__93__20140922__C/TIME__93__20140922__C__1800.mp4",
"2500": "http://video.net2.tv/PORTICO/NEWS/TIME/TIME__93/TIME__93__20140922__C/TIME__93__20140922__C__2500.mp4"
}
},
"hlsStartingOffset": 5,
"hls": "http://video.net2.tv/PORTICO/NEWS/TIME/TIME__93/TIME__93__20140922__C/playlist.m3u8"
},
}, -continued

```
        {
          "URL": "http://tums.portico.net2.tv/ad-breaks/5249feb40a32670000072df5.json",
          "_type": "AdBreak"
        },
        {
          "_type": "Content",
          "duration": 323,
          "videoURLs": {
            "h5": "http://n2.tv-source-
videos.s3.amazonaws.com/sourceVideos/PORTICO/NEWS/TIME/TIME_93/TIME_93_20140922_D.mov",
            "mp4": {
              "720p": {
                "1200":
"http://video.net2.tv/PORTICO/NEWS/TIME/TIME_93/TIME_93_20140922_D/TIME_93_20140922_D_1200.mp4",
                "1800":
"http://video.net2.tv/PORTICO/NEWS/TIME/TIME_93/TIME_93_20140922_D/TIME_93_20140922_D_1800.mp4",
                "2500":
"http://video.net2.tv/PORTICO/NEWS/TIME/TIME_93/TIME_93_20140922_D/TIME_93_20140922_D_2500.mp4"
              }
            },
            "hlsStartingOffset": 5,
            "hls":
"http://video.net2.tv/PORTICO/NEWS/TIME/TIME_93/TIME_93_20140922_D/playlist.m3u8"
          },
        }
      ],
      "poster":
"http://videostatics.net2.tv/PORTICO/NEWS/TIME/TIME_93/TIME_93_HazmatSuit_UI_320x180.jpg",
      "threshold": 15,
      "stitchedHLS":
"http://reflux.portico.net2.tv/episode/stitched/541c8bb713347d6d6fa82171.json"
    },
  ],
}
```

Appendix B: An Example of a Response from the Tums Server

Appendix B illustrates an example of a response from the Tums server 116. The response is based on the following request from a client device 106: http://tums.portico.net2.tv/ad-breaks/5249FEB40A32670000072DF5.json?clientid=Roku-spence.

The sample response below returns two advertisements for the AdBreak data included in the request.

```
[ { _type: 'ad',
   id: '5249feb40a32670000072df5',
   duration: 31,
   videoURLs:
    { hls: 'http://video.net2.tv/linearCreatives/541a166934c6a747059ea839/hi/playlist.m3u8',
     mp4:
      { '720p':
          { '1200':
'http://video.net2.tv/linearCreatives/541a166934c6a747059ea839/hi/hi_1200.mp4',
           '1800':
'http://video.net2.tv/linearCreatives/541a166934c6a747059ea839/hi/hi_1800.mp4',
           '2500':
'http://video.net2.tv/linearCreatives/541a166934c6a747059ea839/hi/hi_2500.mp4' } } },
   events:
    { impression:
      { type: 'impression',
       urls:
        [
'http://t4.liverail.com/?metric=impression&cofl=0&flid=0&pos=0&coid=59200&pid=24062
&nid=24062&oid=78827&olid=58061371&cid=203125&tpcid=&vid=PORTICO&amid=&cc
=default&pp=&vi=0&vv=476&sg=&tsg=&pmu=1&pau=1&psz=0&ctx=&tctx=&coty=7&a
dt=0&did=&buid=&scen=46114_46114&mca=&mma=&mct=0&url=&trid=54209efd0a70f7.48629586
&bidf=0.00000&bids=0.00000&bidt=0&bidh=0&bidlaf=0&sdk=0&cb=5104.75.103 .26.138.0
&ver=1&w=&wy=&x=29&y=29&xy=2652&z2=0',
'http://t4.liverail.com/?metric=rsync&p=5054&redirect=http%3A%2F%2Fidsync.rlcdn.com%
2F382476.gif%3Fpartner_uid%3D63497284' ] },
      start: { type: 'start', urls: [ ] },
      creativeView: { type: 'creativeView', urls: [ ] },
      firstQuartile:
       { type: 'firstQuartile',
        urls: [
'http://t4.liverail.com/?metric=view25&pos=0&coid=59200&pid=24062&nid=24062&oid=78827
&olid=58061371&cid=203125&tpcid=&vid=PORTICO&amid=&cc=default&pp=&vi=
```

-continued

0&vv=476&sg=&tsg=&pmu=1&pau=1&psz=0&ctx=&tctx=&coty=7&adt=0&did=&buid=&
scen=46114_46114&mca=&mma=&mct=0&url=&trid=54209efd0a70f7.48629586&bidf=0.0
0000&bids=0.00000&bidt=0&bidh=0&bidlaf=0&sdk=0&cb=5104.75.103.26.138.0&ver=1&
w=&wy=&x=&y=&xy=' ] },
midpoint:
{ type: 'midpoint',
urls: [
'http://t4.liverail.com/?metric=view50&pos=0&coid=59200&pid=24062&nid=24062&oid=78827
&olid=58061371&cid=203125&tpcid=&vid=PORTICO&amid=&cc=default&pp=&vi=
0&vv=476&sg=&tsg=&pmu=1&pau=1&psz=0&ctx=&tctx=&coty=7&adt=0&did=&buid=&
scen=46114_46114&mca=&mma=&mct=0&url=&trid=54209efd0a70f7.48629586&bidf=0.00000
&bids=0.00000&bidt=0&bidh=0&bidlaf=0&sdk=0&cb=5104.75.103.26.138.0&ver=1&
w=&wy=&x=&y=&xy=' ] },
thirdQuartile:
{ type: 'thirdQuartile',
urls: [
'http://t4.liverail.com/?metric=view75&pos=0&coid=59200&pid=24062&nid=24062&oid=78827
&olid=58061371&cid=203125&tpcid=&vid=PORTICO&amid=&cc=default&pp=&vi=
0&vv=476&sg=&tsg=&pmu=1&pau=1&psz=0&ctx=&tctx=&coty=7&adt=0&did=&buid=&
scen=46114_46114&mca=&mma=&mct=0&url=&trid=54209efd0a70f7.48629586&bidf=0.00000
&bids=0.00000&bidt=0&bidh=0&bidlaf=0&sdk=0&cb=5104.75.103.26.138.0&ver=1&
w=&wy=&x=&y=&xy=' ] },
complete:
{ type: 'complete',
urls: [
'http://t4.liverail.com/?metric=view100&pos=0&coid=59200&pid=24062&nid=24062&oid=
78827&olid=58061371&cid=203125&tpcid=&vid=PORTICO&amid=&cc=default&pp=&vi
=0&vv=476&sg=&tsg=&pmu=1&pau=1&psz=0&ctx=&tctx=&coty=7&adt=0&did= &buid=
&scen=46114_46114&mca=&mma=&mct=0&url=&trid=54209efd0a70f7.48629586&bidf=0.00000
&bids=0.00000&bidt=0&bidh=0&bidlaf=0&sdk=0&cb=5104.75.103.26.138.0&ver=1
&w=&wy=&x=&y=&xy=' ] } } },
{ _type: 'ad',
id: '5249feb40a32670000072df5',
duration: 30,
videoURLs:
{ hls:
'http://video.net2.tv/linearCreatives/541fdef6562e88420524168f/YEwhTZAX_1600K_1280x
720/playlist.m3u8',
mp4:
{ '720p':
{ '1200':
'http://video.net2.tv/linearCreatives/541fdef6562e88420524168f/YEwhTZAX_1600K_1280x
720/YEwhTZAX_1600K_1280x720_1200.mp4',
'1800':
'http://video.net2.tv/linearCreatives/541fdef6562e88420524168f/YEwhTZAX_1600K_1280x
720/YEwhTZAX_1600K_1280x720_1800.mp4',
'2500':
'http://video.net2.tv/linearCreatives/541fdef6562e88420524168f/YEwhTZAX_1600K_1280x
720/YEwhTZAX_1600K_1280x720_2500.mp4' } } },
events:
{ impression:
{ type: 'impression',
urls:
[
'http://t4.liverail.com/?metric=impression&cofl=0&flid=0&pos=0&coid=75290&pid=24062
&nid=1701&oid=&olid=&cid=&tpcid=0&vid=PORTICO&amid=&cc=default&pp=&vi=0&
vv=476&sg=&tsg=&pmu=1&pau=1&psz=0&ctx=&tctx=&coty=7&adt=0&did=&buid=&scen
=783_46114&mca=&mma=&mct=0&url=&trid=54209efd108678.99215339&bidf=1.20000
&bids=0.00000&bidt=1&bidh=0&bidlaf=0&sdk=0&cb=2097.75.103.26.138.0&ver=1&w=&
wy=&x=1197&y=1197&xy=fa96&z2=0.01200',
'http://t4.liverail.com/?metric=rsync&p=5054&redirect=http%3A%2F%2Fidsync.rlcdn.com%
2F382476.gif%3Fpartner_uid%3D82718624' ] },
start: { type: 'start', urls: [ ] },
creativeView: { type: 'creativeView', urls: [ ] },
firstQuartile:
{ type: 'firstQuartile',
urls:
[
'http://t4.liverail.com/?metric=view25&pos=0&coid=75290&pid=24062&nid=1701&oid=&olid
=&cid=&tpcid=0&vid=PORTICO&amid=&cc=default&pp=&vi=0&vv=476&sg=&tsg=&
pmu=1&pau=1&psz=0&ctx=&tctx=&coty=7&adt=0&did=&buid=&scen=783_46114&mca=
&mma=&mct=0&url=&trid=54209efd108678.99215339&bidf=1.20000&bids=0.00000&bidt
=1&bidh=0&bidlaf=0&sdk=0&cb=2097.75.103.26.138.0&ver=1&w=&wy=&x=&y=&xy=',
'http://bt1.yumenetworks.com/bt/static_beacon_350930_25_149985_78500_2127110719_0_0
_0_1625JbYatUMG.gif?dpId=1&dmkId=0&dmlId=0&osId=0&osvId=0&bId=0&bvId=0&spId
=110&kv=0_0&pSize=0&pLoc=0&pFold=0&aVisibility=0&gid=919863262&isOnP=1&nod
=9956&ias=81;104;135;141;143;166;216;220;225&published_player=NA&content_playlist
=NA&sessionId=0A80187101489F6D0CB43DB103081638&sdk_ver=NA&yppld=true' ]
}, -continued

```
    midpoint:
      { type: 'midpoint',
       urls:
        [
'http://t4.liverail.com/?metric=view50&pos=0&coid=75290&pid=24062&nid=1701&oid=&olid
=&cid=&tpcid=0&vid=PORTICO&amid=&cc=default&pp=&vi=0&vv=476&sg=&tsg=&
pmu=1&pau=1&psz=0&ctx=&tctx=&coty=7&adt=0&did=&buid=&scen=783__46114&mca=
&mma=&mct=0&url=&trid=54209efd108678.99215339&bidf=1.20000&bids=0.00000&bidt
=1&bidh=0&bidlaf=0&sdk=0&cb=2097.75.103.26.138.0&ver=1&w=&wy=&x=&y=&xy=',
'http://bt1.yumenetworks.com/bt/static__beacon__350930__50__149985__78500__2127110719__0__0
__0__1625JbYatUMG.gif?dpId=1&dmkId=0&dmlId=0&osId=0&osvId=0&bId=0&bvId=0&spId
=110&kv=0__0&pSize=0&pLoc=0&pFold=0&aVisibility=0&gid=919863262&isOnP=1&nod
=9956&ias=81;104;135;141;143;166;216;220;225&published__player=NA&content__playlist
=NA&sessionId=0A80187101489F6D0CB43DB103081638&sdk__ver=NA&yppld=true' ]
},
    thirdQuartile:
      { type: 'thirdQuartile',
       urls:
        [
'http://t4.liverail.com/?metric=view75&pos=0&coid=75290&pid=24062&nid=1701&oid=&olid
=&cid=&tpcid=0&vid=PORTICO&amid=&cc=default&pp=&vi=0&vv=476&sg=&tsg=&
pmu=1&pau=1&psz=0&ctx=&tctx=&coty=7&adt=0&did=&buid=&scen=783__46114&mca=
&mma=&mct=0&url=&trid=54209efd108678.99215339&bidf=1.20000&bids=0.00000&bidt
=1&bidh=0&bidlaf=0&sdk=0&cb=2097.75.103.26.138.0&ver=1&w=&wy=&x=&y=&xy=',
'http://bt1.yumenetworks.com/bt/static__beacon__350930__75__149985__78500__2127110719__0 __0
__0__1625JbYatUMG.gif?dpId=l&dmkId=0&dmlId=0&osId=0&osvId=0&bId=0&bvId=0&sp
Id=110&kv=0__0&pSize=0&pLoc=0&pFold=0&aVisibility=0&gid=919863262&isOnP=1&nod
=9956&ias=81;104;135;141;143;166;216;220;225&published__player=NA&content__playlist
=NA&sessionId=0A80187101489F6D0CB43DB103081638&sdk__ver=NA&yppld=true' ]
},
    complete:
      { type: 'complete',
       urls:
        [
'http://t4.liverail.com/?metric=view100&pos=0&coid=75290&pid=24062&nid=1701&oid=&
olid=&cid=&tpcid=0&vid=PORTICO&amid=&cc=default&pp=&vi=0&vv=476&sg=&tsg=
&pmu=1&pau=1&psz=0&ctx=&tctx=&coty=7&adt=0&did=&buid=&scen=783__46114&mca
=&mma=&mct=0&url=&trid=54209efd108678.99215339&bidf=1.20000&bids=0.00000&bidt
=1&bidh=0&bidlaf=0&sdk=0&cb=2097.75.103.26.138.0&ver=1&w=&wy=&x=&y=&xy
=',
'http://bt1.yumenetworks.com/bt/static__beacon__350930__100__149985__78500__2127110719__0__
0__0__1625JbYatUMG.gif?dpId= 1&dmkId=0&dmlId=0&osId=0&osvId=0&bId=0&bvId=0&s
pId=110&kv=0 0&pSize=0&pLoc=0&pFold=0&aVisibility=0&gid=919863262&isOnP=1&
nod=9956&ias=81;104;135;141;143;166;216;220;225&published__player=NA&content__playlist
=NA&sessionId=0A80187101489F6D0CB43DB103081638&sdk__ver=NA&yppld=true' ]
} } } ]
```

What is claimed is:

1. A computerized method, comprising:

receiving, by a first server, a request from a client device to receive advertisement content, wherein the request includes client information;

retrieving, by the first server, break data based on the request, wherein the break data includes one or more links to a second server;

replacing, by the first server, any dynamic parameters contained in the one or more links with at least one value based on the client information;

requesting, by the first server from the second server, at least one advertisement segment based on the one or more links;

receiving, by the first server from the second server, a first response to the request; and determining, by the first server, whether the first response is empty:

if the first response is empty, providing, by the first server to the client device, a link to one of a plurality of placeholder videos as a second response, and if the first reponse is not empty, providing, by the first server to the client device, the second response based on the first response, wherein the second response is in a JavaScript Object Notation (JSON) format and is insertable into a playlist at one or more break locations at the client device, wherein the client information includes a type of the client device and at least one of an internet protocol (IP) address of the client device or a transcoding indicator, wherein the one ore more links to a second server are selected based, in whole or in part, on the type of the client device.

2. The method of claim 1, wherein the second response is the same as the first response.

3. The method of claim 1, further comprising discarding, by the first server, any duplicated content from the first response to form the second response before providing the second response to the client device.

4. The method of claim 1, wherein the first response includes one or more first impression links, wherein each of the one or more first impression links corresponds to one of the requested advertisement segments, wherein at least one of the one or more first impression links can be used by the client device to notify a third server each time the corresponding advertisement segment is played, in whole or in part, by the client device.

5. The method of claim 4, further comprising adding, by the first server, one or more second impression links to the second response, wherein each of the one or more second impression links corresponds to one or more advertisement segments included in the second response, wherein at least one of the one or more second impression links can be used by the client device to notify the first server each time the corresponding one or more advertisement segments are played, in whole or in part, by the client device.

6. The method of claim 1, wherein the client information includes the transcoding indicator, wherein if the first response is not empaty, further comprising:

determining, by the first server, whether the first response needs to be transcoded into a target format based on the transcoding indicator:

if the first response needs to be transcoded into the target format and the first response has not been previously transcoded, providing a link to one of a plurality of placeholder videos as the second response to the client device; and if the first response does not need to be transcoded into the target format or the first response has been prviously transcoded, providing the second reponse based on the first response.

7. An apparatus, comprising:

one or more processors;

a memory storing a program that, when executed, causes the one or more processors to:

receive a request from a client device to receive advertisement content, wherein the request includes client information;

retrieve break data based on the request, wherein the break data includes one or more links to a first server;

replace any dynamic parameters contained in the one or more links with at least one value based on the client information;

request, from the first server, at least one advertisement segment based on the one or more links;

receive, from the first server, a first response to the request; and determine whether the first response is empty:

if the first response is empty, provide, to the client device, a link to one of a plurality of placeholder videos as a second response, and if the first reponse is not empty, provide, to the client device, the second response based on the first response, wherein the second response is in a JavaScript Object Notation (JSON) format and is insertable into a playlist at one or more break locations at the client device, wherein the client information includes a type of the client device and at least one of an internet protocol (IP) address of the client device or a transcoding indicator, wherein the one ore more links to a second server are selected based, in whole or in part, on the type of the client device.

8. The apparatus of claim 7, wherein the second response is the same as the first response.

9. The apparatus of claim 7, wherein the program, when executed, further causes the one or more processors to discard any duplicated content from the first response to form the second response before providing the second response to the client device.

10. The apparatus of claim 7, wherein the first response includes one or more first impression links, wherein each of the one or more first impression links corresponds to one of the requested advertisement segments, wherein at least one of the one or more first impression links can be used by the client device to notify a second server each time the corresponding advertisement segment is played, in whole or in part, by the client device.

11. The apparatus of claim 10, further comprising adding, by the first server, one or more second impression links to the second response, wherein each of the one or more second impression links corresponds to one or more advertisement segments included in the second response, wherein at least one of the one or more second impression links can be used by the client device to notify the one or more processors each time the corresponding one or more advertisement segments are played, in whole or in part, by the client device.

12. The apparatus of claim 7, wherein the client information includes the transcoding indicator, wherein if the first response is not empaty, the program, when executed, further causes the one or more processors to:

determine whether the first response needs to be transcoded into a target format based on the transcoding indicator:

if the first response needs to be transcoded into the target format and the first response has not been previously transcoded, provide a link to one of a plurality of placeholder videos as the second response to the client device; and if the first response does not need to be transcoded into the target format or the first response has been prviously transcoded, provide the second reponse based on the first response.

13. A non-transitory computer readable medium comprising executable instructions, when executed by one or more processors, operable to cause an apparatus to:

receive a request from a client device to receive advertisement content, wherein the request includes client information;

retrieve break data based on the request, wherein the break data includes one or more links to a first server;

replace any dynamic parameters contained in the one or more links with at least one value based on the client information;

request, from the first server, at least one advertisement segment based on the one or more links;

receive, from the first server, a first response to the request; and determine whether the first response is empty:

if the first response is empty, provide, to the client device, a link to one of a plurality of placeholder videos as a second response, and if the first reponse is not empty, provide, to the client device, the second response based on the first response, wherein the second response is in a JavaScript Object Notation (JSON) format and is insertable into a playlist at one or more break locations at the client device, wherein the client information includes a type of the client device and at least one of an internet protocol (IP) address of the client device or a transcoding indicator, wherein the one ore more links to a second server are selected based, in whole or in part, on the type of the client device.

14. The non-transitory computer readable medium of claim 13, wherein the second response is the same as the first response.

15. The non-transitory computer readable medium of claim 13, wherein the executable instructions are further operable to cause the apparatus to discard any duplicated content from the first response to form the second response before providing the second response to the client device.

16. The non-transitory computer readable medium of claim 13, wherein the first response includes one or more first impression links, wherein each of the one or more first impression links corresponds to one of the requested advertisement segments, wherein at least one of the one or more first impression links can be used by the client device to notify a second server each time the corresponding advertisement segment is played, in whole or in part, by the client device.

17. The non-transitory computer readable medium of claim 16, further comprising adding, by the first server, one or more second impression links to the second response, wherein each of the one or more second impression links corresponds to one or more advertisement segments included in the second response, wherein at least one of the one or more second impression links can be used by the client device to notify the apparatus each time the corresponding one or more advertisement segments are played, in whole or in part, by the client device.

18. The non-transitory computer readable medium of claim 13, wherein the client information includes the transcoding indicator, wherein if the first response is not empaty, the executable instructions are further operable to cause the apparatus to:

determine whether the first response needs to be transcoded into a target format based on the transcoding indicator:

if the first response needs to be transcoded into the target format and the first response has not been previously transcoded, provide a link to one of a plurality of placeholder videos as the second response to the client device; and if the first response does not need to be transcoded into the target format or the first response has been prviously transcoded, provide the second reponse based on the first response.

* * * * *